(12) United States Patent
Cohen et al.

(10) Patent No.: US 11,608,651 B2
(45) Date of Patent: Mar. 21, 2023

(54) SWIMMING POOL WITH COMPOSITE WALL

(71) Applicants: WILBAR INTERNATIONAL, INC., Hauppauge, NY (US); AVIENT CORPORATION, Avon Lake, OH (US)

(72) Inventors: Steven Cohen, Locust Valley, NY (US); Jonathan Spiegel, Avon Lake, OH (US); David Vallee, Avon Lake, OH (US); Benjamin Pilpel, Avon Lake, OH (US); Patrick Masterson Inman, Kings Park, NY (US); John H. Hornickel, Avon Lake, OH (US)

(73) Assignees: WILBAR INTERNATIONAL, INC., Hauppauge, NY (US); AVIENT CORPORATION, Avon Lake, OH (US)

( * ) Notice: Subject to any disclaimer, the term of this patent is extended or adjusted under 35 U.S.C. 154(b) by 0 days.

(21) Appl. No.: 16/645,264

(22) PCT Filed: Sep. 6, 2018

(86) PCT No.: PCT/US2018/049697
§ 371 (c)(1),
(2) Date: Mar. 6, 2020

(87) PCT Pub. No.: WO2019/051049
PCT Pub. Date: Mar. 14, 2019

(65) Prior Publication Data
US 2020/0277803 A1   Sep. 3, 2020

Related U.S. Application Data

(60) Provisional application No. 62/666,457, filed on May 3, 2018, provisional application No. 62/556,055, filed on Sep. 8, 2017.

(51) Int. Cl.
*E04H 4/00* (2006.01)

(52) U.S. Cl.
CPC ..... *E04H 4/0043* (2013.01); *E04H 2004/0068* (2013.01)

(58) Field of Classification Search
CPC .......... B29C 70/38–388; E04H 4/0018; E04H 4/0031–0062
See application file for complete search history.

(56) References Cited

U.S. PATENT DOCUMENTS 2,834,702 A * 5/1958 Gibb ................... E04C 2/22
428/110
3,208,084 A * 9/1965 Collins ............... E04H 4/0037
428/116

(Continued)

FOREIGN PATENT DOCUMENTS

AU   2016204704 A1   8/2016
DE   202004009531 U1   9/2004

OTHER PUBLICATIONS

International Search Report for Int'l Application No. PCT/US18/49697, pp. 1-3 (dated Jan. 29, 2019).

(Continued)

*Primary Examiner* — David P Angwin
*Assistant Examiner* — Nicholas A Ros
(74) *Attorney, Agent, or Firm* — Hoffmann and Baron, LLP

(57) ABSTRACT

A swimming pool wall, and method for forming same, including a plurality of layers of reinforced composite material. Each layer includes a thermoplastic resin and a plurality of elongate glass strands of reinforcing material. A first set of the plurality of layers has the strands miming in a first direction, and a second set of the plurality of layers has the strands miming in a second direction. The first direction is offset in angle from the second direction, and the first and (Continued)

second set of layers are fused together to form a unitary composite wall. The principles of hoop strength applicable to the swimming pool wall also apply to other cylindrical structures needing hoop strength arising from pressures inside or outside the cylindrical structure. The wall structure may be a plurality of interconnected panels both arcuate and arcuate and planar in shape to determine the overall shape of the composite wall enclosing an area where water or ice is retained.

12 Claims, 14 Drawing Sheets

(56) References Cited

U.S. PATENT DOCUMENTS

| | | | | |
|---|---|---|---|---|
| 3,486,289 | A * | 12/1969 | Lavack | E04H 4/0018 52/741.12 |
| 3,749,244 | A * | 7/1973 | Jannuzzi, Jr. | E04H 4/0043 210/206 |
| 3,869,736 | A * | 3/1975 | Valois | E04H 4/0043 4/506 |
| 4,047,340 | A * | 9/1977 | Witte | E04H 4/144 52/169.7 |
| 4,117,614 | A * | 10/1978 | Bickford | G09F 1/12 40/748 |
| 4,177,614 | A | 12/1979 | Arp | |
| 5,010,603 | A | 4/1991 | Hertzog | |
| 5,151,322 | A * | 9/1992 | Kimoto | B29C 70/14 428/299.1 |
| 5,328,744 | A | 7/1994 | Kaufmann et al. | |
| 5,603,129 | A | 2/1997 | Chou | |
| 5,815,853 | A * | 10/1998 | Chase | E04H 4/0037 4/506 |
| 6,272,696 | B1 * | 8/2001 | Sobel | E04H 4/005 4/506 |
| 7,464,417 | B2 | 12/2008 | Liu | |
| 7,802,324 | B2 * | 9/2010 | Layfield | A47K 3/00 4/584 |
| 8,071,694 | B2 | 12/2011 | Yu et al. | |
| 8,381,325 | B2 | 2/2013 | Tassone, Jr. et al. | |
| 9,194,147 | B2 * | 11/2015 | Campodonico | E04H 4/0031 |
| 2004/0078884 | A1 | 4/2004 | Pugliese, Jr. et al. | |
| 2011/0078851 | A1 * | 4/2011 | Beale | C09D 5/1693 4/488 |
| 2015/0204476 | A1 * | 7/2015 | Lazzara | B65D 85/08 156/178 |
| 2019/0240934 | A1 * | 8/2019 | Prins | B29C 70/386 |

OTHER PUBLICATIONS

Extended European Search Report for Application No. EP 18853085.1 dated Sep. 1, 2021.

* cited by examiner

SWIMMING POOL WITH COMPOSITE WALL

This application claims the benefit of priority to U.S. Provisional Patent Application Ser. No. 62/556,055 filed on Sep. 8, 2017 and U.S. Provisional Patent Application Ser. No. 62/666,457 filed on May 3, 2018, the entire contents of each application being incorporated by reference herein for all purposes.

TECHNOLOGICAL FIELD

The present disclosure relates to a swimming pool having a composite wall, and more particularly, a swimming pool having a thermoplastic wall with reinforcing elements.

BACKGROUND

Swimming pool walls, and in particular above ground swimming pools, are typically constructed of a perimeter wall made from rolled steel material that is supported by frame elements. The perimeter wall forms an interior in which a flexible liner is placed to retain the water. This construction is beneficial in that it allows for above ground and semi-above ground pools of various sizes and shapes to be cost effectively manufactured and installed.

Some swimming pools are formed with a non-metallic sidewall such as flexible polymers. These pools include small children's pools which are filled with water of only a few inches deep and typically emptied after each use. Other non-metallic wall pools include an external frame. A pliable waterproof fabric is attached to the frame and forms a flexible basin. The weight of the water expands the basin walls to keep them apart. An upper edge may include an inflatable portion which floats and also helps the pool retain its structure. However, these types of pools are limited in the size and shape in which they can be formed. They lack the durability of steel wall pools.

Fiberglass reinforced polymer composite has also been used to formed pools. These pools are preformed offsite as a large rigid basin of thermoset polymers and then transported to the installation site. Due to the nature of the construction, transportation, and installation associated with such pools, the size and shape of the pool is limited.

While steel allows for above ground swimming pools to be formed in different shapes and sizes, the material can degrade, most often by corrosion, over time thereby limiting the useful life of the swimming pool. This is especially the case for pools using saltwater systems, which are becoming more popular. The salt can quickly degrade the properties of the steel pool wall and shorten its useful lifespan to retain thousands of gallons of water in a confined space against the perimeter strength of the structure. Moreover, regardless of use of fresh or salt water, any metallic structure could be adversely affected by the chemicals typically used to sanitize and otherwise maintain the water in the swimming pool. Even structures of aluminum can be affected.

Accordingly, it would be desirable to provide a swimming pool having a wall which can withstand the forces of a full size pool and still retain its shape and resist corrosive degradation.

SUMMARY

The present disclosure provides a swimming pool including a base rail, a top rail, and a plurality of supports extending between the top rail and the base rail spaced along a circumference of the base rail. A pool wall extends between the bottom rail and top rail and forming an enclosed perimeter of the swimming pool. The pool wall includes a plurality of layers of reinforced composite material fused together to form a unitary composite wall. Each layer includes elongate glass fiber strands of reinforcing material. One of the plurality of layers has the strands running in a first direction, and a second of the plurality of layers has strands running in a second direction, wherein the first direction is offset in angle from the second direction.

The present disclosure further provides a swimming pool wall including a plurality of layers of reinforced composite material. Each layer includes a thermoplastic resin and a plurality of elongate glass strands of reinforcing material. A first set of the plurality of layers has the strands running in a first direction, and a second set of the plurality of layers has the strands running in a second direction. The first direction is offset in angle from the second direction, and the first and second set of layers are fused together to form a unitary composite wall.

The present disclosure still further provides a method of forming a swimming pool wall comprising joining, to form a cylindrical structure, opposing ends of a laminate comprising a plurality of layers of reinforced composite material, each layer including thermoplastic resin and a plurality of elongate glass strands of reinforcing material, a first set of the plurality of layers having the strands running in a first direction, and a second set of the plurality of layers having strands running in a second direction, wherein the first direction is offset in angle from the second direction, and the first and second set of layers are fused together to form a unitary composite wall; and inserting a pool liner in the interior of the cylindrical structure.

The present disclosure still further provides a swimming pool including a base rail and a top rail. A plurality of supports extend between the top rail and the base rail spaced along a circumference of the base rail. A pool wall extends between the bottom rail and top rail and forming an enclosed perimeter of the swimming pool. The pool wall includes a reinforced polymer composite formed of a thermoplastic resin and e-glass fiber strands encapsulated therein.

The present disclosure still further provides a cylindrical structure requiring hoop strength to resist pressure from inside or outside the cylinder, including a sheet of reinforced fiber composite having opposing lengthwise ends. The sheet comprises a plurality of layers of glass fibers embedded in a thermoplastic matrix. The plurality of layers has multiple relative orientations among the layers. The structure includes a means for joining the opposing lengthwise ends.

The present disclosure further provides a swimming pool including a base rail, a top rail, and plurality of supports extending between the top rail and the base rail spaced along a circumference of the base rail; and a pool wall extending between the bottom rail and top rail and forming an enclosed perimeter of the swimming pool, the pool wall including an inner wall surface and outer wall surface and a core disposed there between, at least one of the inner wall surface and the outer wall surface including a plurality of layers of reinforced composite material fused together to form a unitary composite wall, each layer including elongate glass fiber strands of reinforcing material, one of the plurality of layers having the strands running in a first direction, and a second of the plurality of layers having strands running in a second direction, wherein the first direction is offset in angle from the second direction, the inner and outer wall surfaces being secured to opposed sides of the core.

DETAILED DESCRIPTION

Figure 1:
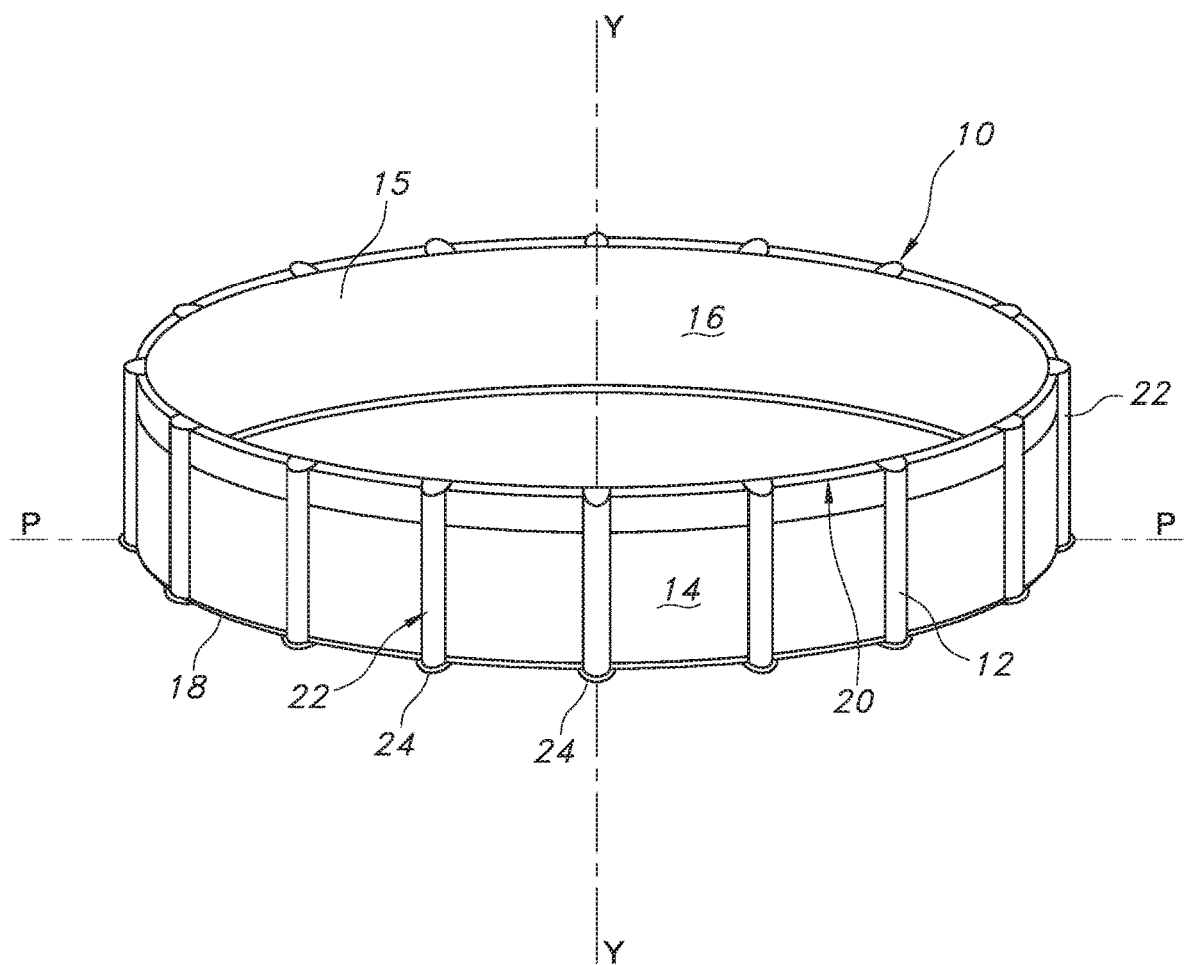
FIG. 1 is a top perspective view of a swimming pool incorporating the features of the present disclosure.
Figure 2:
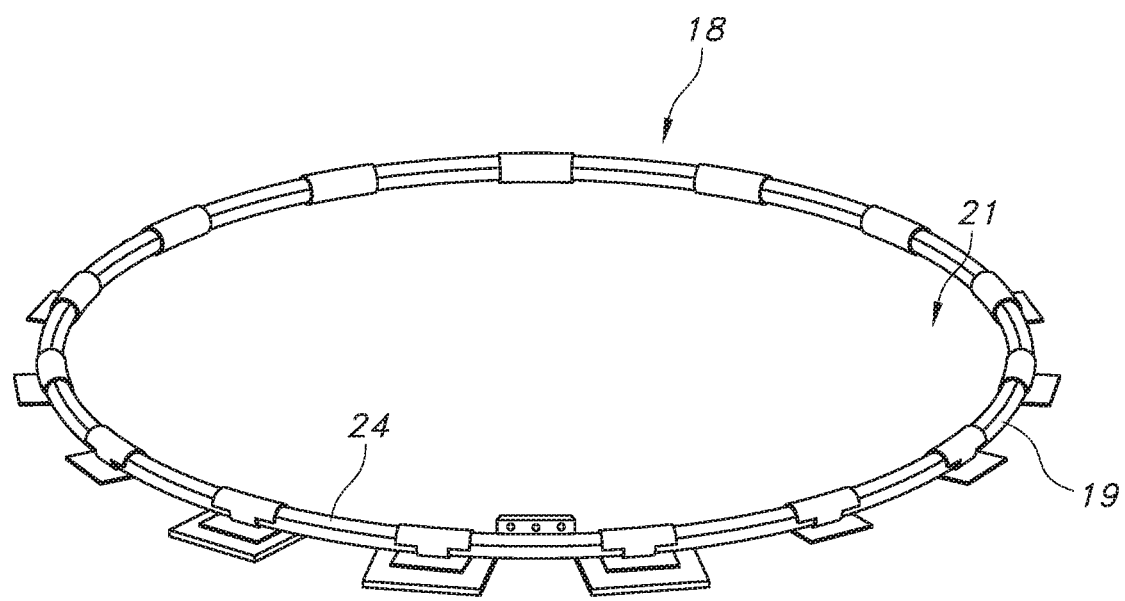
FIG. 2 is a top perspective view of a bottom rail for supporting a pool perimeter wall.
Figure 3:
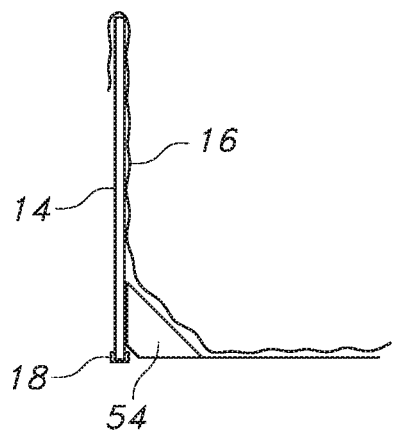
FIG. 3 is a cross-sectional view of the pool wall.
Figure 4:
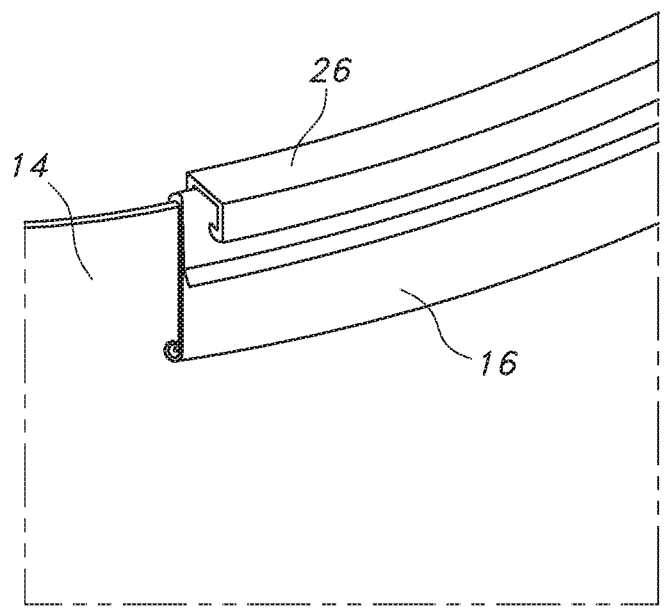
FIG. 4 is a partial perspective view of coping secured to the top of the pool wall.
Figure 5:
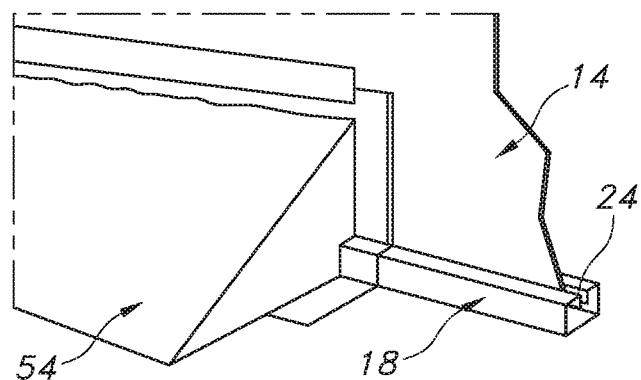
FIG. 5 is a partial perspective view of the bottom of the pool wall.

With reference to FIGS. 1-5, a swimming pool 10, includes a frame 12 and a perimeter pool wall 14 which is adapted to be secured to the pool frame 12. The pool wall 14 forms and surrounds a pool interior 15. A flexible pool liner 16 is disposed in the pool interior 15 and is generally attached to the top of the pool wall 14. The liner 16 is formed of a waterproof material such as flexible polyvinyl chloride ("PVC") and forms a basin that holds the water.

The pool wall is made from at least thermoplastic resin and glass fiber. Non-limiting examples of the thermoplastic resin are polyolefins such as polyethylene (PE) in its various density grades and polypropylene (PP), polyesters such as polyethylene terephthalate (PET) and glycol modified polyethylene terephthalate (PETG), thermoplastic olefins (TPO), and combinations thereof. Of these polypropylene is present preferred.

Non-limiting examples of the glass fiber are e-glass and s-glass. Individual glass fiber diameters can range from about 10 μm (also called microns) to about 25 μm and preferably from about 14 μm to about 18 μm. The glass fibers can be introduced into the thermoplastic in the form of rovings. The glass fiber reinforcement can comprise continuous fibers or discontinuous fibers or both, depending the hoop strength of pool wall 14 needed. The diameters of glass fiber and continuity in the various layers of pool wall 14 can be the same or different depending on choice of the polymer engineer.

The glass fibers can comprise from about 50 weight percent to about 75 weight percent and preferably from about 60 weight percent to about 70 weight percent of the pool wall 14, with the remaining weight percentage being the thermoplastic resin and also minor amounts, if any, of optional functional additives. The weight percent content of glass fiber in the various layers of pool wall 14 can be the same or different depending on choice of the polymer engineer.

The frame 12 includes various interconnected rigid elements including a bottom rail 18, a top rail 20, and a plurality of vertically aligned upright supports 22 spaced around the perimeter of the pool. The bottom rail 18 includes a plurality of members 19 joined together and laid upon a support surface 21, such as level ground. The bottom rail 18 is laid in a configuration corresponding to the desired perimeter shape of the pool. The bottom rail 18 includes a groove 24 that receives and retains the bottom of the pool wall. The vertical supports 22 are secured to the bottom rail 18 and extend upwardly engaging the top rail 20 which forms an upper portion of the wall. Coping 26 may be used to secure the liner to the top rail 20 in a manner known in the art.

Figure 6:
FIG. 6 is a top view of the pool wall.
Figure 7A:
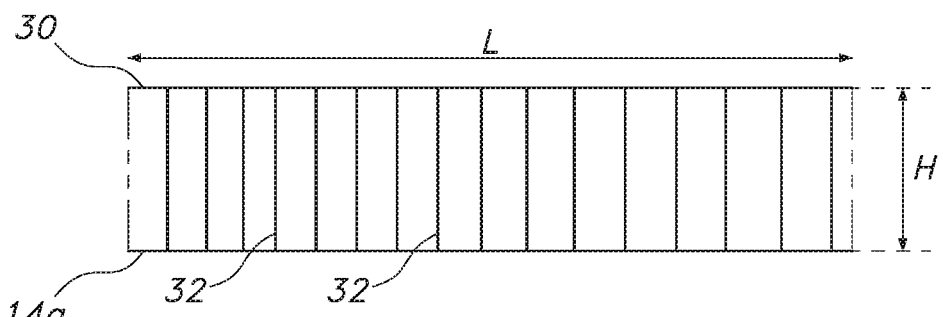
FIGS. 7A to 7D are side elevational views of various layers which form the pool wall.
Figure 7B:
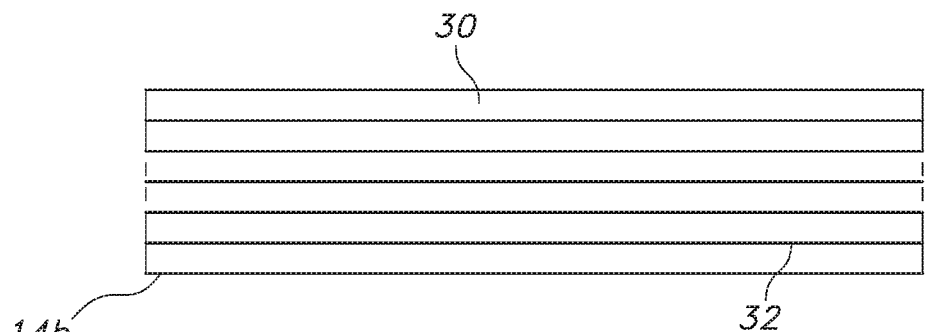
Figure 7C:
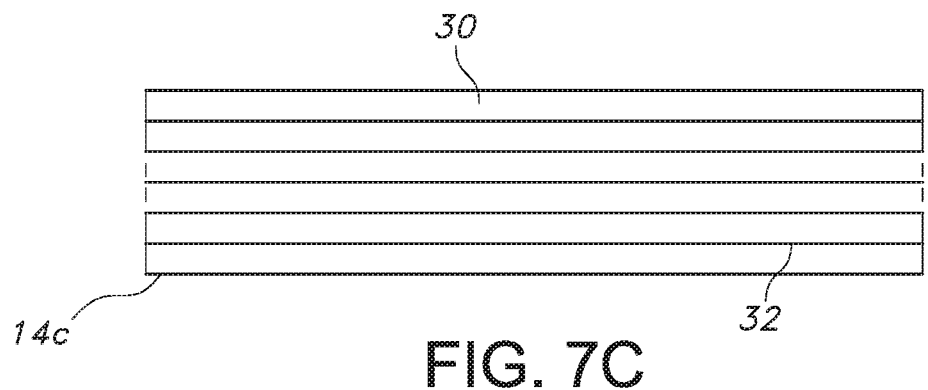
Figure 7D:
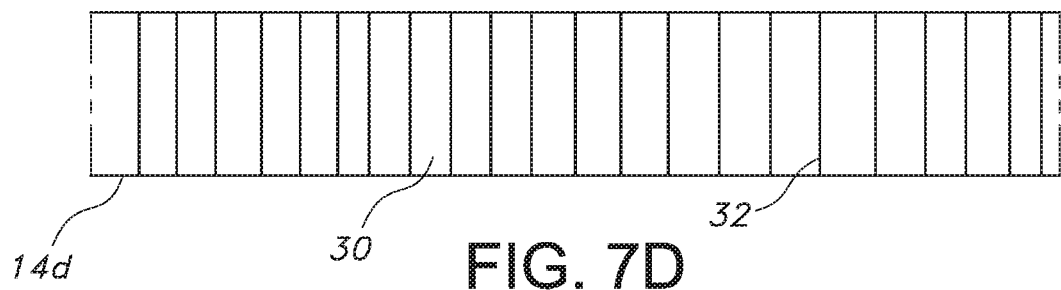

With reference to FIGS. 6 to 7D, the pool perimeter wall 14 may be formed of a rolled sheet of a composite of material formed from thermoplastic material with reinforcing strands. This material may be a single continuous sheet which is cut to length to form the perimeter pool wall 14.

In a preferred embodiment, the pool wall 14 may be formed of a reinforced polymer composite formed of a thermoplastic resin 30 and e-glass fiber strands 32 encapsulated therein. The glass fibers are preferably continuous strands of non-woven material extending unidirectionally, usually made by a pultrusion process in which the continuous pulling of strands through a polymeric bath permits formation of sheets, tapes, or other extruded shapes of strands reinforcing the polymer which has fused around such strands in such extruded shape. A number of companies make pultruded reinforced polymer composites, including PolyOne Corporation via its Advanced Composites Group, particularly its Polystrand business selling thermoplastic fiber reinforced composites.

In a preferred embodiment, multiple wall layers 14a-d of reinforced material are joined together in a variety of relative orientations of fiber reinforcement to form a single wall structure 14.

The reinforced material is laminate of a plurality of composite layers including at least a first composite layer and a second composite layer, each comprising a plurality of longitudinally and unidirectionally oriented fibers in a thermoplastic matrix. The plurality of composite layers are bonded together to form the laminate.

The various layers can have a unidirectional orientation or alignment of fibers 32 in the thermoplastic matrix relative to the direction of the pultrusion process. Zero degrees (0°) means that the orientation of the fibers 32 is the same as the pultrusion direction as shown in FIGS. 7B and 7C. Ninety degrees (90°) means that the orientation of the fibers 32 is orthogonal or transverse to the pultrusion direction as shown in FIGS. 7A and 7D.

The lamination of multiple layers relative to their respective orientations is a significant determining factor to the strength, flexibility, and other physical properties of the reinforced thermoplastic composite laminate as it is used in particular architectural or construction assemblies.

Non-limiting examples of the number of layers can range from 2 to 6 layers with orientations of any combination of 0° and 90° and any angles between them. Thus, this invention is not limited to any particular number of layers in the composite nor any particular combination of orientations of layers in the composite. However, it has been found to be desired that a four-layer reinforced composite laminate provides satisfactory strength to serve as the pool wall 14, and it is preferred when those four layers are oriented in a 90°/0°/0°/90° combination.

Without being limited to a particular theory, the 90°/0°/0°/90° four-layer reinforced composite for a pool wall the 0° designation in this case means parallel to the diametral plane P-P of the cylindrical pool structure, while the 90° designation is defined as parallel to the axial direction Y-Y of the cylindrical pool structure. With reference to FIGS. 7A-D, the 90° layers, 14*a* and 14*b*, form the outermost circumferential layer and innermost circumferential layer of the structure. A pool wall formed in this manner provides the strength required around the circumference to resist the pressure produced by the water inside the structure, as well as the required stiffness in the vertical (axial) direction to resist the buckling loads induced on the top edge of the structure by the attached flexible pool liner when filled with water. This orientation of layers also increases the flexibility of the pool wall parallel to the diametral plane P-P, which allows the wall material to be more easily rolled into a smaller diameter cylinder for storage and shipping.

Additionally, this construction of the individual wall layers, and other structures contemplated herein, benefit from the reinforcement which renders the structure more impact resistant and more "buckling" resistant than would exist in either a thin gauge steel or aluminum sheet construction typically used in an above ground swimming pool construction.

With reference to FIGS. 7A-D, the individual wall layers 14*a*-*d* may include a plurality of continuous glass fiber strands each extending in a predetermined uniform direction. The strands are preferably continuous in that they extend along the wall uninterrupted. The wall may be formed of four layers 14*a*, 14*b*, 14*c* and 14*d*. Two of the layers 14*b* and 14*c* may include the continuous glass fiber strands 32 each extending longitudinally along the length, L, of the wall material, i.e., extending about the circumference of the swimming pool. Two of the other layers 14*a* and 14*d* may include continuous glass fiber strands 32 each extending along the height, H, of the wall, i.e., vertically from the top to the bottom of the wall. This non-limiting embodiment utilizes the 90°/0°/0°/90° orientation of the four layers. Another embodiment could be utilizing a 90°/0°/90° orientation of the three layers with the sole inside layer being of a different thickness than the two inside layers of the 90°/0°/0°/90° orientation of the four layers.

Accordingly, the two types of layers have strands running 90 degrees offset from each other. But in the preferred combination, the two outside layers have unidirectional fiber reinforcement transverse to the two inside layers.

To obtain each of the layers, pultrusion is preferably used when the reinforcing fibers are continuous. Each layer may be formed separately by covering and encapsulating the glass strands within thermoplastic resin, such that when the resin cures the glass strands are embedded therein. To obtain the 90°/0°/0°/90° orientation, the wall layers 14*a* and 14*d* are cut from sheets and oriented transversely to the direction of wall layers 14*b* and 14*c*. The four-layer composite is then produced to the length, L, of pool wall 14.

The wall layers 14*a* to *d* may be assembled together such that the layers having latitudinally oriented strands and layers having longitudinally oriented strands are joined together, preferably in that 90°/0°/0°/90° combination to the length, L, of pool wall 14. The orientation of the strands and the positioning of the various layers have a significant influence on the physical characteristics of the wall. A swimming pool wall is subjected to long term hoop stress caused by the water and requires a continuing hoop strength to counter the force of water against the pool interior 15. Plastic materials tend to undergo creep deformation when subjected to continuous force. Creep results in dimensional changes and weakening of the structure, which the hoop strength of the pool wall 14 must resist. Pool walls are also subject to mechanical stresses caused by users both in and out of the pool impacting the wall. The wall is also subjected to the extremes of temperature and other exposure to the elements. The composite pool wall 14 is constructed to address such factors.

This 90°/0°/0°/90° orientation combination of the four layers 14*a*-14*d* has been found to provide the satisfactory results for resisting the high hoop stresses created when water is added to the pool. The pool wall 14 is able to maintain its shape and prevents bulging.

With reference to FIG. 6, once the layers are aligned over one another, the four layers 14*a*, 14*b*, 14*c* and 14*d* may be bonded together using heat and pressure. The surfaces of the adjacent layers fuse together such that the wall becomes a single unitary sheet of material for forming the pool wall 14.

While the pool wall is described herein as being formed of 4 layers of reinforced thermoplastic, it is within the contemplation of the present invention that the number of layers could be varied from at least two to as many as six or eight or ten in order to create the desired wall strength and flexibility. The orientations of each layer, expressed in angular degrees from the direction of pultrusion, can vary as determined without undue experimentation by a person having ordinary skill in the art after understanding this disclosure. The desired hoop strength for the pool wall benefits from orthogonal orientations among the four layers but not in an alternating manner. Yet, other orientations could introduce biased angles such as 30°, 45°, or 60° for layers between the 0° layers and the 90° layers, if "layup" of the layers is possible during formation of the composite. Stated generically with respect to the four layers, but applicable to any laminate of two layers or more, the orientation can be Not 0°/0°/0°/Not 0°. Stated more generically with respect to three layers or more, the orientation can be Not 0°/0°$_n$/ Not 0°, where n is between 1 and 8. Stated even more generically with respect to three layers or more, the orientation can be Not 0°/(Not 0°$_m$) (0°$_n$)/Not 0°, where n is between 1 and 8 and m is between 0 and 7.

In addition, in forming the wall 14, sheets of the wall material may be placed side edge to side edge and joined together in order to increase the width of the sheet and in turn the height H of the pool wall. Therefore, the vertical height of the pool wall can be formed to a desired value. For example, two sheets having a width of 5 feet can be joined together side to side to form a sheet 10 feet wide for use as a pool wall 14 or other object requiring such height, if hoop strength can be achieved via the combinations of orientations of layers and numbers of layers sufficient to assure internal integrity with and without contents pressing on the pool interior 15.

UV light from the sun tends to degrade plastics such as thermoplastic. In order to further increase the durability of the pool wall 14, the outer surface of the wall may be covered with a UV protectant film 31 containing polypropylene and ultra-violet light inhibitors or absorbers or stabilizers, such as conventional or custom-made film from DuPont Teijin, Optimum Plastics or Wiman Corporation. This film blocks or attenuates the transmission of UV light which tends to degrade the thermoplastic.

This film blocks or attenuates the transmission of UV light which tends to degrade the thermoplastic. In addition, this covering may include a UV protectant film layer having graphics formed thereon and may be attached to the outer surface of the wall in order to provide an aesthetic appearance. Alternatively, the materials used to construct the pool wall 14 especially the exposed layers of the pool wall 14.

The inner surface of the wall although covered by the pool liner 16, is also susceptible to UV light passing through the liner. Therefore, it is within the contemplation of the present invention that carbon black or any conventional UV absorber may be added to the resin to help reduce the negative effects of UV light on the wall material.

After the sheet wall material is formed, the material is cut to a predetermined length consistent with the circumference of the pool, e.g., pools of greater circumference will have longer wall lengths. The wall material can be cut to different length in order to accommodate swimming pools of different configurations and sizes. It is also within the contemplation of the present invention that when forming the pool wall 14, various cutouts or openings may be formed in the material in order to allow for skimmers, plumbing and electrical or other service hardware to extend through the pool wall.

Figure 8:
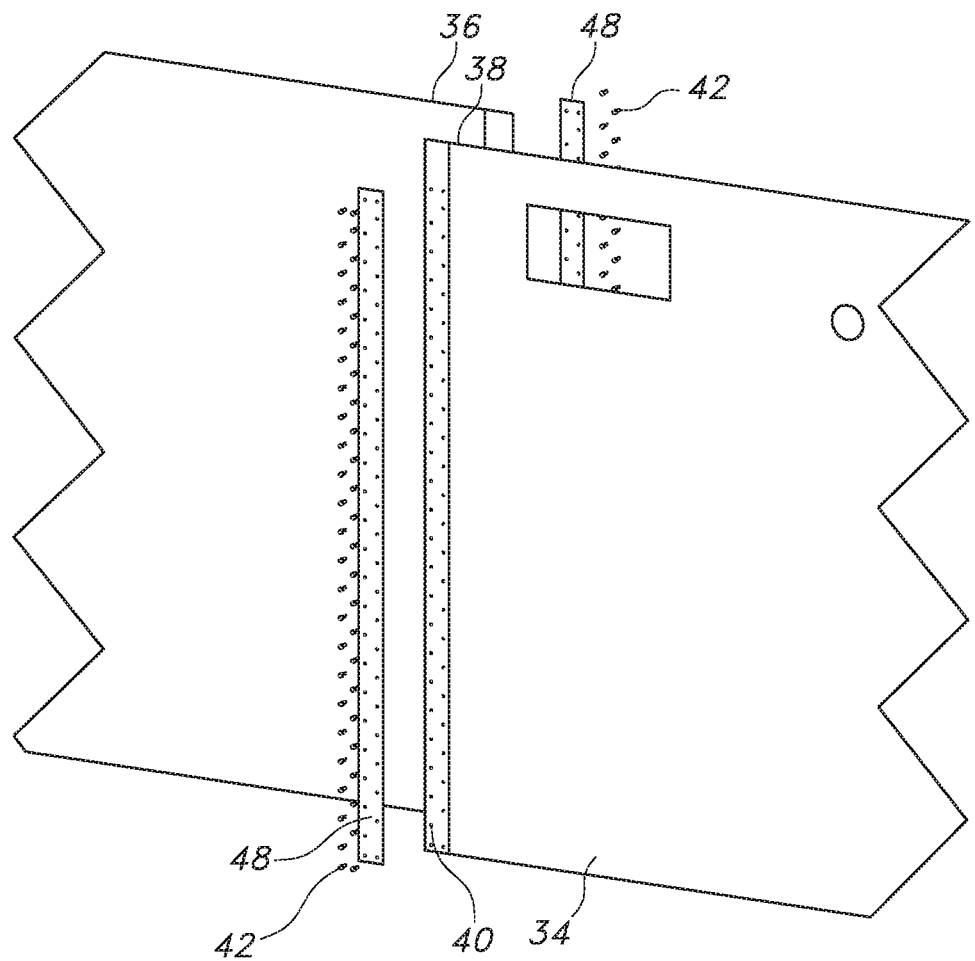
FIG. 8 is an exploded view of the ends of the pool wall.
Figure 9:
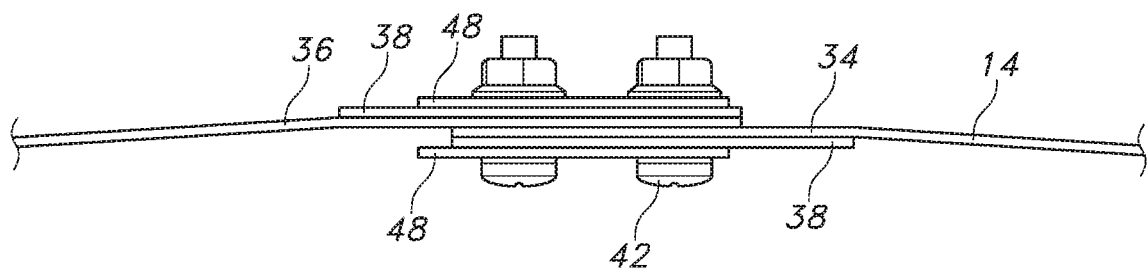
FIG. 9 is a top plan view of the poll wall ends joined together.

With reference to FIGS. 8 and 9, upon installing the swimming pool, in order to form the perimeter of the pool, pool wall ends 34 and 36 are secured together at a joint 37. The joint 37 resists the significant hoop stress generated by the water pushing out in all directions. In order to form the joint, the pool wall ends 34 and 36 are overlapped and a plurality of fasteners 42 is placed through holes 40 formed in the wall ends. A plurality of through holes 40 is formed along the height of the reinforced ends to receive the fasteners 42. In order to securely join the wall ends 34 and 36 together the wall ends are reinforced with reinforcement strips 38. The reinforcement strips may be a strip of reinforced thermoplastic resin bonded to the wall ends 34 and 36 such that they become an integral part thereof. This increases the thickness of the wall ends at the location where the holes 40 are formed, thereby adding increased strength and preventing the wall material from tearing.

In addition, in order to reinforce the joint between the ends of the walls, a pair of metallic elongate bars 48 may be used. One bar 48 may be placed on the inside wall surface and the other on the outside wall surface, sandwiched therebetween the wall ends 34 and 36. The bars 48 may include through holes 50 therein which align with through holes 40 in the wall ends in order to allow fasteners 42 to extend there through. The bars 48 provide extra reinforcement to the wall ends. This reinforcement is desirable since when the pool is filled with water, there is a considerable hoop stress which acts to pull the wall ends apart. The reinforced ends of the walls along with the metallic members 48 ensure that the ends remain secured together.

In order to assemble the pool, the pool wall 14 may be inserted into the upper and bottom rails and attached to vertical supports in a manner similar to that used for steel wall construction. In addition, with reference to FIGS. 3 and 5, cove material 54 may be formed along the bottom of the wall 14 in order to support the liner 16. The cove material 54 may be sand, earth, rigid foam or other material known in the art. When water is added to the pool interior the weight stretches and smoothens out the liner 16. The force of the water acts on the liner which is pushed up again the pool wall 14. The water pushes outwardly and creates a force resisted by the pool wall 14.

With reference to FIGS. 10-16, an alternative embodiment of a swimming pool wall is shown. The pool wall 100 may be formed with a core of insulating material 102 sandwiched between two wall surfaces, an inner wall surface 104, and an outer wall surface 106. The inner wall surface 104 forms the inside of the swimming pool and is typically covered with a liner in a manner known in the art. The outer wall surface 106 forms the pool's exterior surface.

Both of the inner and outer wall surfaces, 104 and 106, may be formed of layers of reinforced thermoplastic including a plurality of continuous glass fiber strands each extending in a predetermined uniform direction in a similar manner as the wall 14 described above. As with wall 14, each of the wall layers 104 and 106 be formed of four layers. Two of the layers may include the continuous glass fiber strands each extending longitudinally along the length, L, of the wall material, i.e., extending about the circumference of the swimming pool. Two of the other layers may include continuous glass fiber strands each extending along the height, H, of the wall, i.e., vertically from the top to the bottom of the wall.

Alternatively, it is contemplated that only one of the inner and outer wall surfaces be formed as wall 14. For example, the inner wall surface 104 may be formed of the formed of layers of reinforced thermoplastic including a plurality of continuous glass fiber strands as wall 14. In this embodiment, the outer wall surface 106 may be formed of a single layer of unreinforced polymer or of metal.

The inner and outer wall surfaces 104 and 106 may be secured to core 102 of heat insulating material. The insulating material may be formed of foam or other material which acts to retard the transfer of heat. The thickness of the insulating core material 102 made of foam may be approximately one to four inches. However, it is contemplated that the thickness of the insulating core material may be varied depending upon the thermal resistance or insulation value (measured as an "R-factor") desired. In one embodiment, the core 102 of the pool wall 100 may be comprised of rigid closed-cell expanded polystyrene EPS foam with a R10 insulation value. This foam material resists water absorption making it suitable for inground swimming pool installations. The foam material may also be treated with an insecticide and/or pesticide in order to help it sustain a below grade insulation.

Adhesive 109 may be applied to both sides of the core insulating material 102 and the inner and outer wall surfaces may be layered onto opposed sides of the core material. Alternatively or additionally, heat and/or pressure may be applied in order to allow for a firm connection between the inner and outer wall surfaces 104 and 106 and the core 102.

With reference to FIGS. 11-15A and B, the pool wall 100 may be formed by a series of discrete panels 110 which are joined together side edge to side edge in order to form an enclosed pool wall having requisite hoop strength for containment of water or other liquid within an enclosed perimeter and/or circular area 105.

Figure 13:
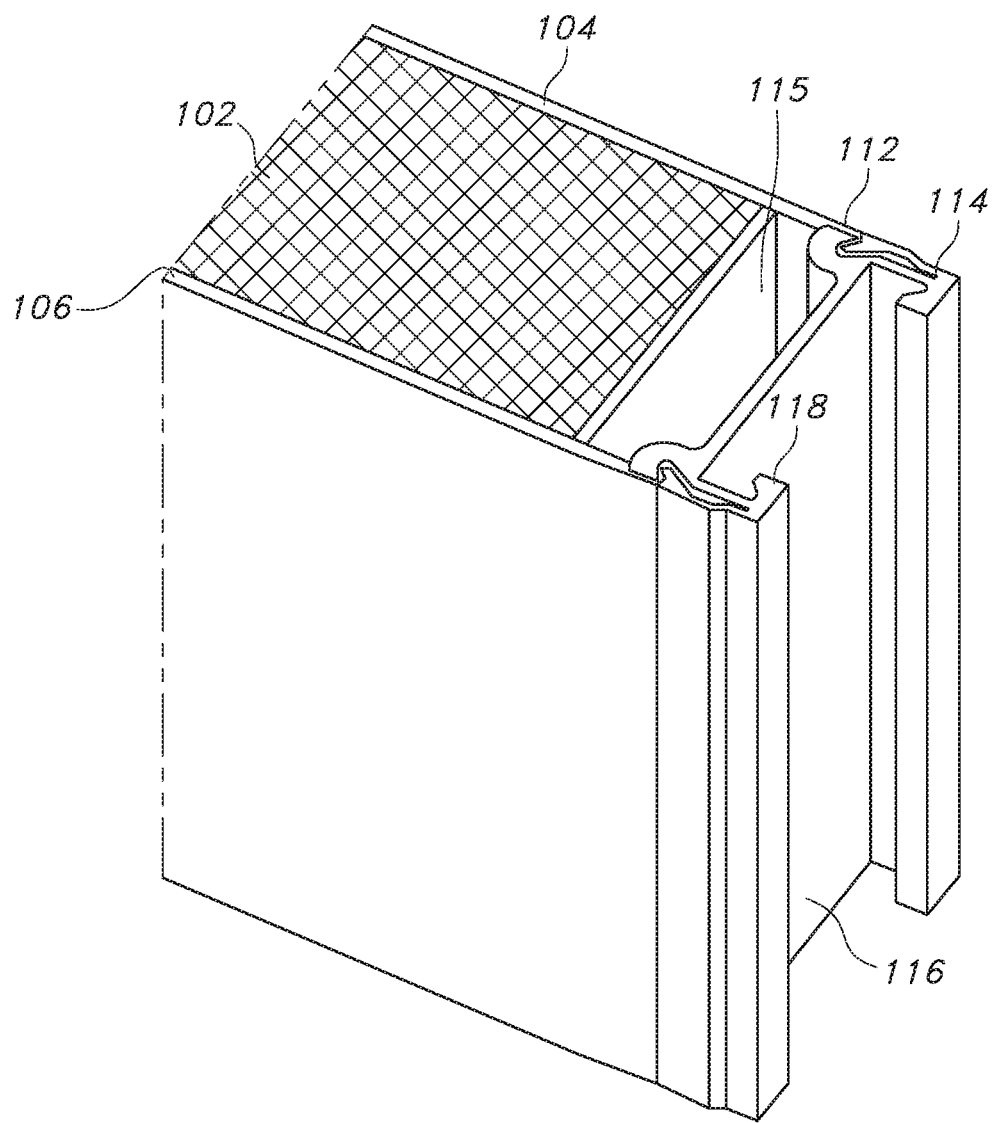
FIG. 13 is a partial end view of the wall of FIG. 10.
Figure 14:
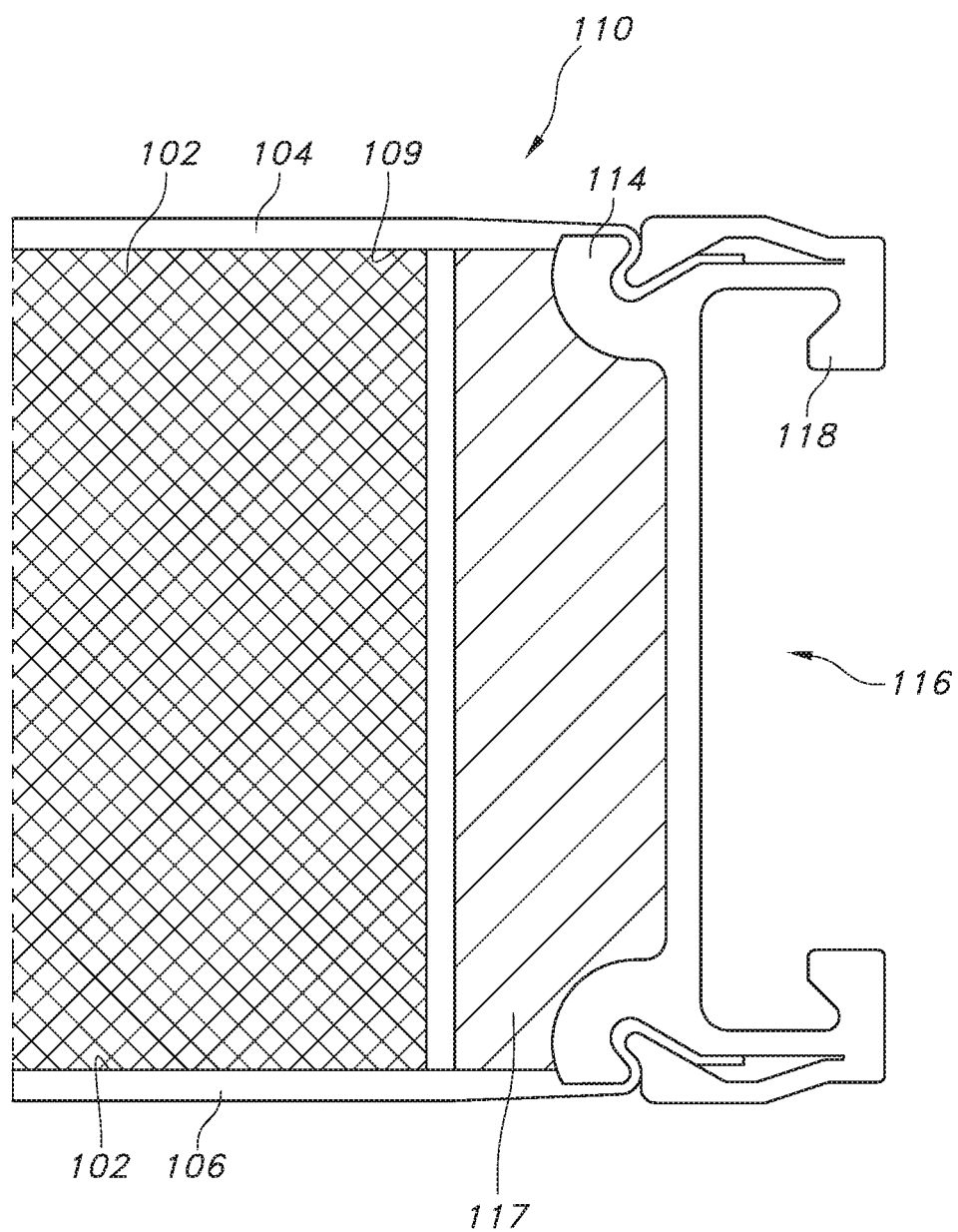
FIG. 14 is a partial plan view of the wall of FIG. 10.
Figure 15A:
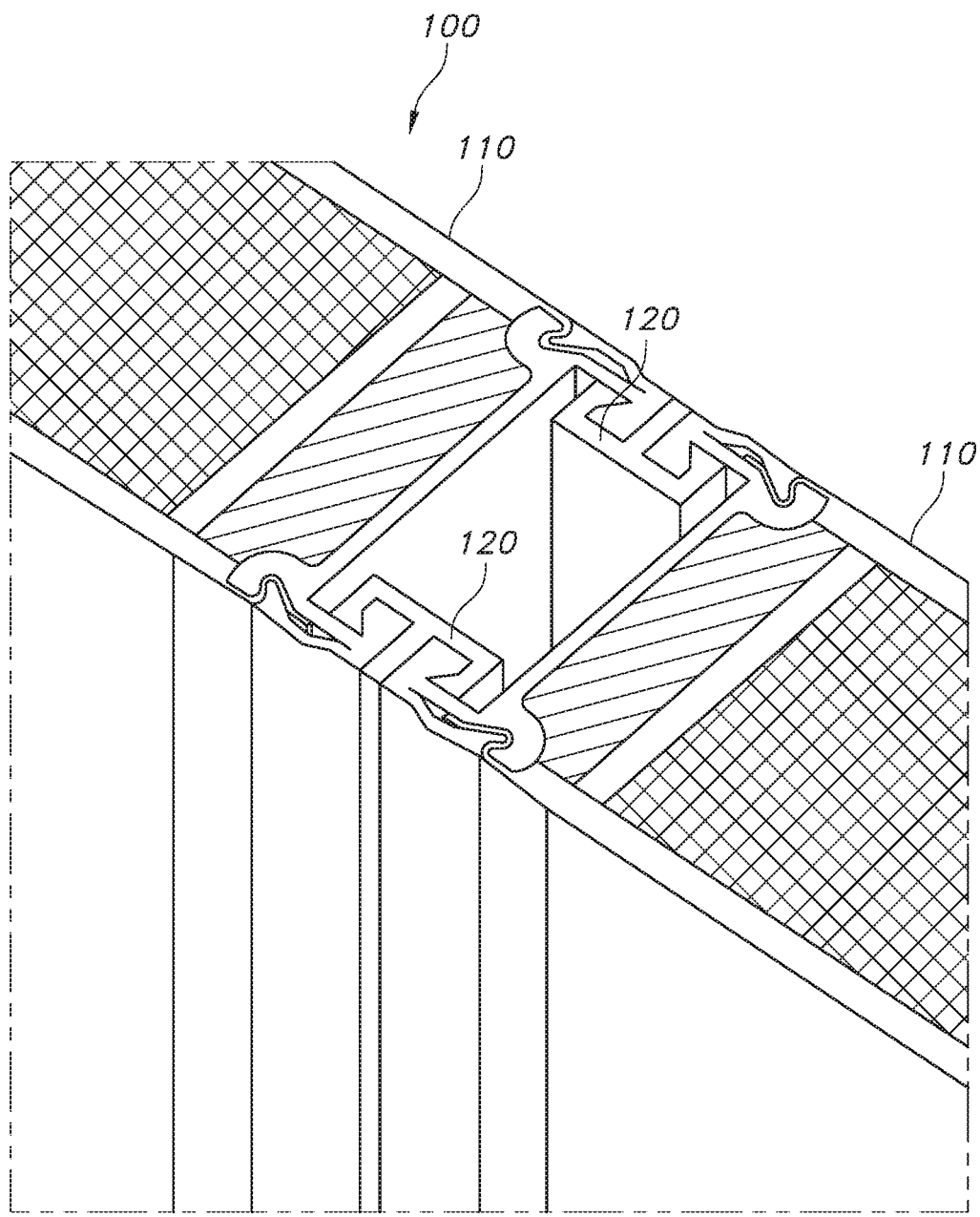
FIG. 15A is a top perspective detail view of two joined wall panels.
Figure 15B:
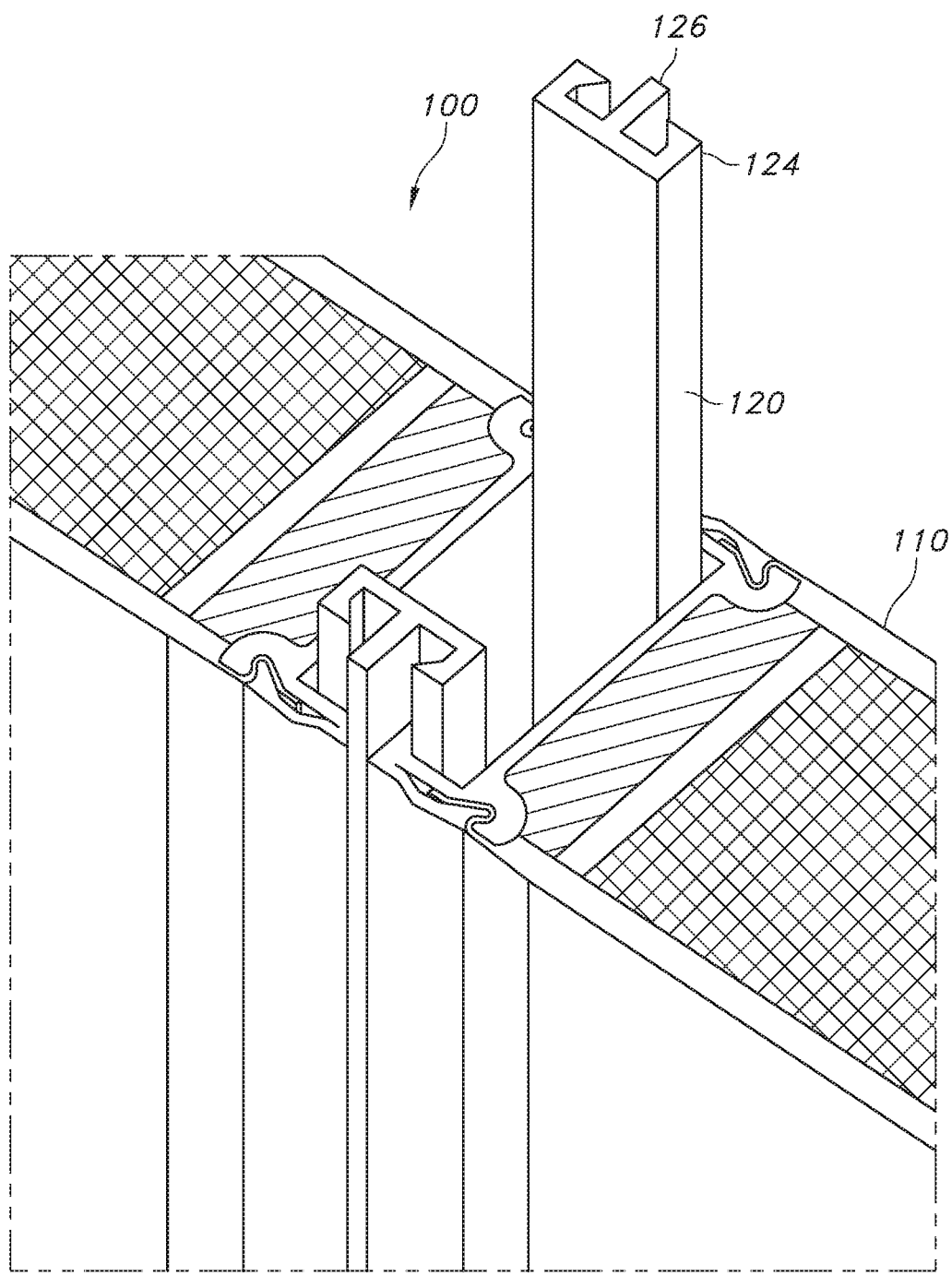
FIG. 15B is a top perspective detail view of two joined wall panels showing a spline partially inserted.

Each wall panel 110 has similarly formed opposed side edges 112 having connecting ends 114. Connecting ends 114 permit adjacently positioned panels to be secured together. The connecting ends 114 may be secured to the panel side edges 112 by mechanical fasteners and/or adhesive. A void 115 may be formed between the connecting end 114 and the foam core 102 as shown in FIG. 13. The void 115 may be filled with expanding polyurethane foam 117 to provide insulation and support. The connecting ends 114 include a channel 116 having inwardly turned lips 118. In one embodiment, the connecting ends may be formed of extruded aluminum. As shown in FIGS. 15A and B, two panels 110 may be joined end to end by elongate splines 120 which interact with the connecting ends 114. Splines 120 may have an E-shaped cross-section with a main wall 122 as well as two end projections 124 and a central projection 126 extending outwardly from the main wall 128. The central projection 126 may be longer then the end projections 124. When two panel ends 114 are placed together, a pair of splines 120 may be inserted into the adjacent channels in order to secure the panels together. One spline 120 may be inserted adjacent the inside wall surface and another spline 120 inserted adjacent the outside wall surface to firmly secure the wall panels 110 together. The end projections 124 engage the connecting end lips 118, thereby preventing the wall panels 110 from separating.

While one embodiment of the interconnectivity of adjoining panels 110 has been described, it is to be understood that a person having ordinary skill in the art without undue experimentation could arrange for other geometries of linkage of adjoining panels 110, particularly in a convenient assembly/disassembly fashion, and especially with structure to assure containment of water or other liquid within the wall 100.

Figure 16:
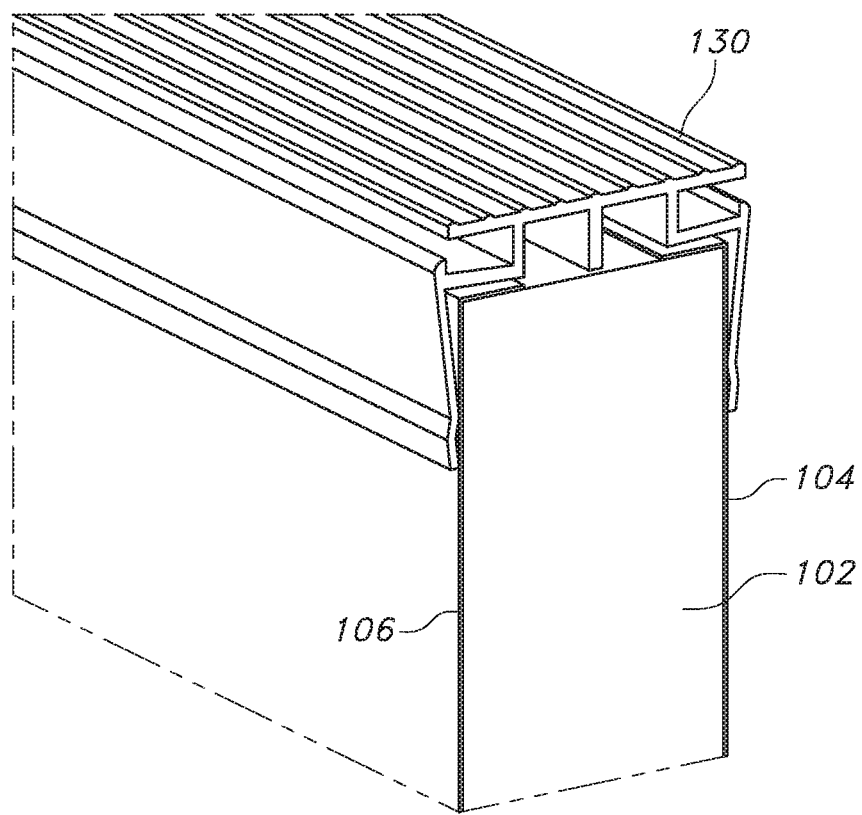
FIG. 16 is a perspective end view of a wall panel with coping.

With reference to FIG. 16, the top of the pool wall 100 may be covered by coping material 130 which protects the upper edges of the thermoplastic wall surfaces and the core.

Having understood the patentably inventive value of pool walls made of fiber reinforced composite of multiple layers having multiple relative orientations among the layers, it is contemplated that any cylindrical structure requiring hoop strength can benefit from the disclosure herein. Non-limiting examples of the types of structures include storage bins for any type of solid or liquid material ranging from cattle feeders to cisterns, temporary shelters, shipping containers, etc. where hoop strength resisting pressure from inside the cylinder is important to the use of the structure. Likewise, hoop strength can be needed for structures where the hoop strength resists pressures from outside the cylinder such as submariner structures of many types. The use of floors and roofs with the cylindrical structure is dependent on the use of the cylindrical structure.

Referring again to FIG. 10, each wall panel 110 may be straight or curved for placement as desired to form a wall 100 of circular "race track" configuration, or "hockey rink" configuration. A "race track" configuration has the shape of a rectangle with semicircles attached at the ends, whereas a "hockey rink" configuration has a rectangular shape with arcuate panels in place of orthogonal corners. The difference between those two wall geometries depends on the number of straight or planar panels 132 interposed between curved or arcuate panels 134 at 180° opposite locations or the number of curved or arcuate panels 132 interposed between straight or planar panels 132 at 90° locations, in order to convert the enclosed circular area into either an area resembling a skating rink or an area resembling a regulation shaped and/or sized hockey rink.

Figure 10:
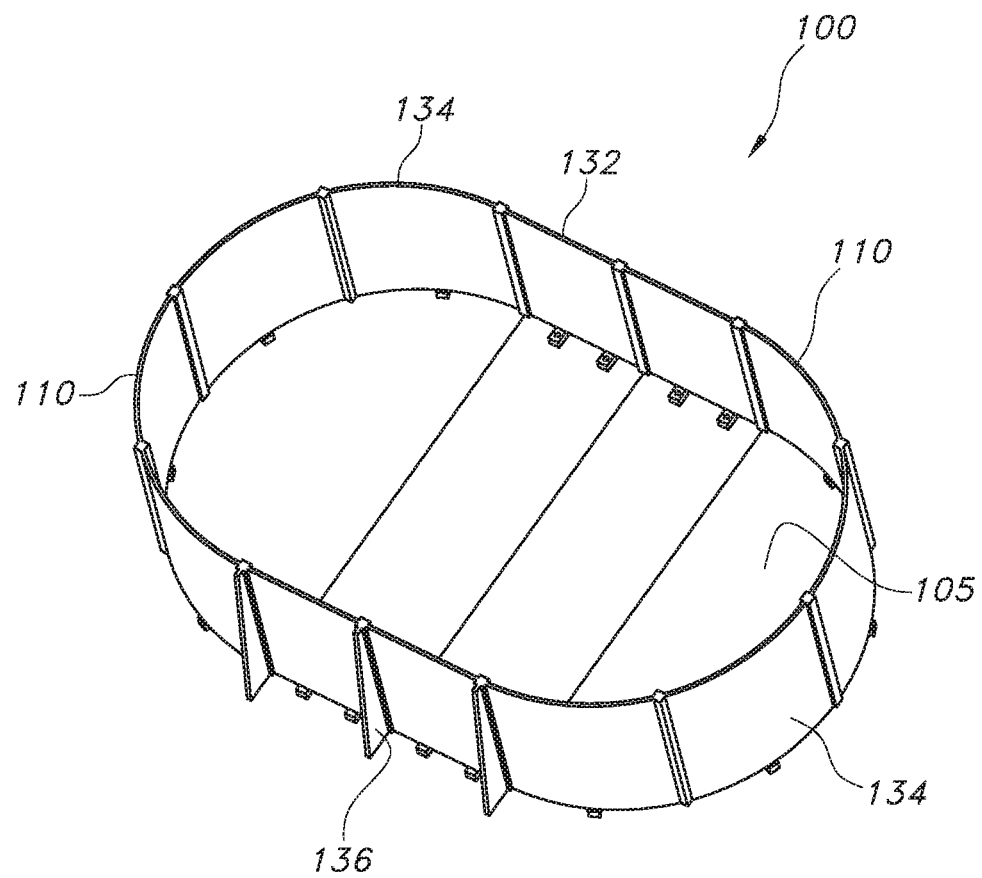
FIG. 10 is a top perspective view of an alternative embodiment of a swimming pool wall.
Figure 11:
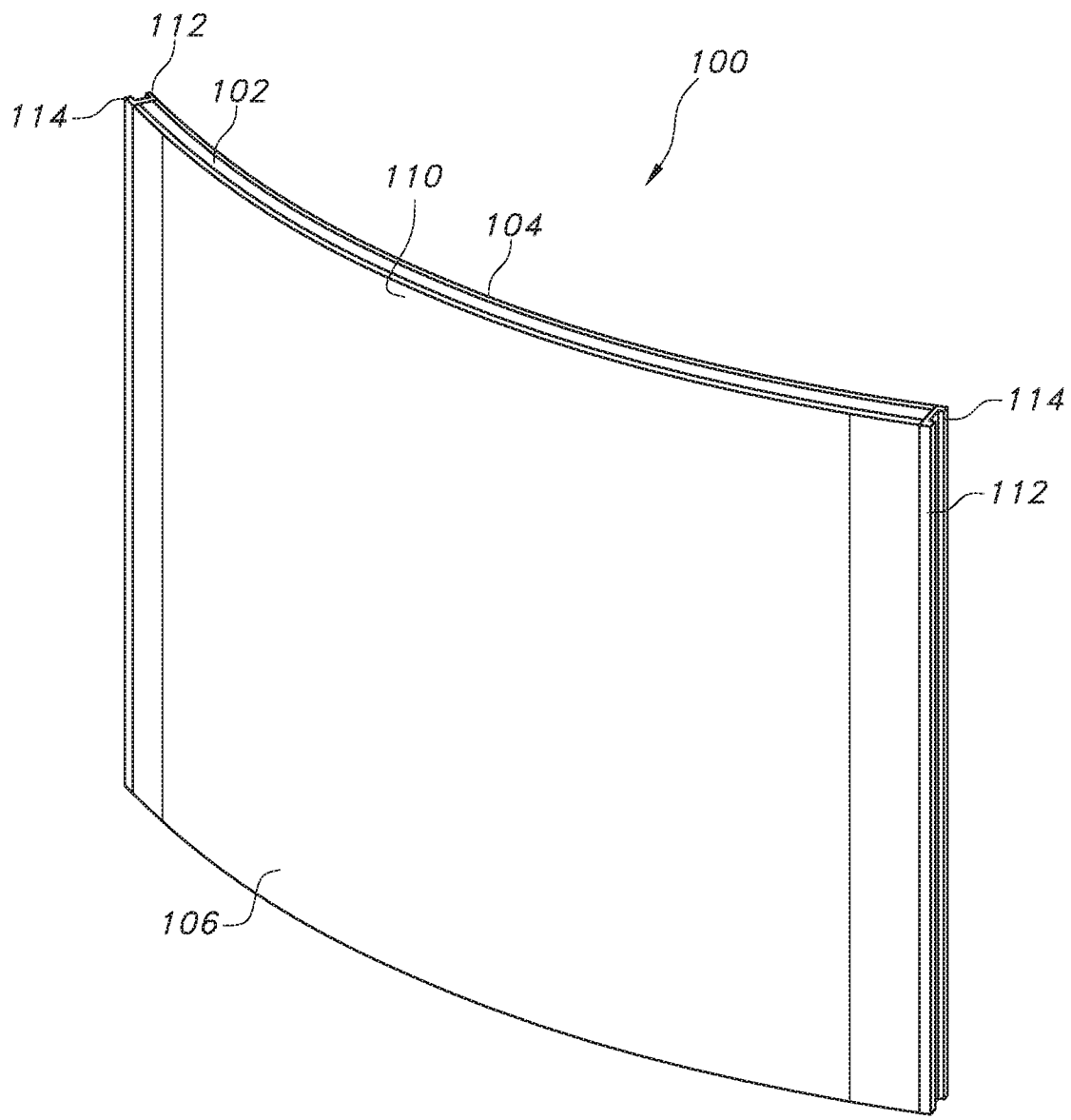
FIG. 11 is a perspective view of a wall panel of FIG. 10
Figure 12:
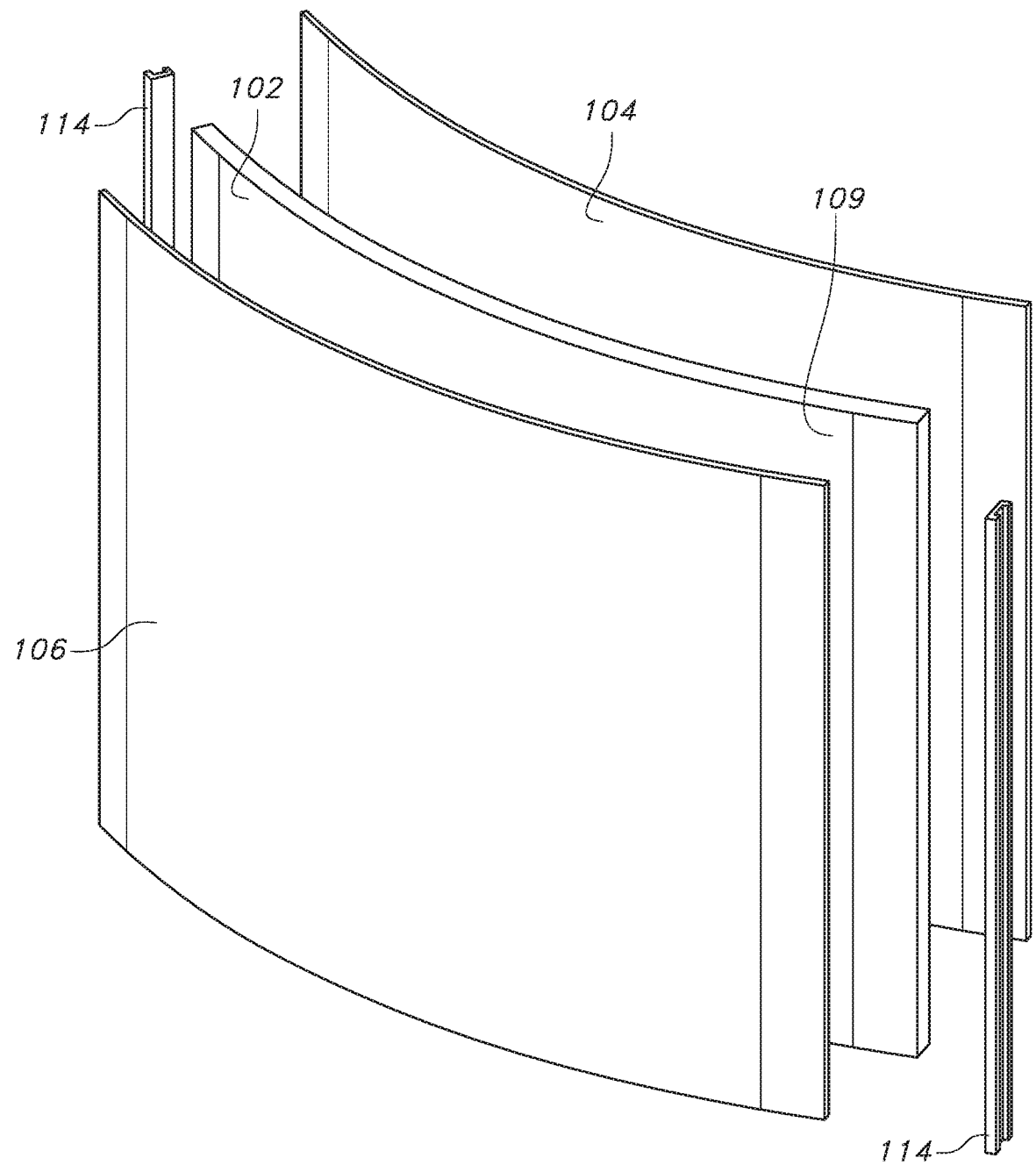
FIG. 12 is an exploded view of the wall of FIG. 10.

Departure from a circular wall to a "race track" skating rink wall or "hockey rink" wall will require adjustment of strength of the panels because of the loss of circular hoop strength, such that the enclosure strength of a "race track" or "hockey rink" geometry is sufficient to restrain water within the wall 100 as much at the interconnections of the planar panels 132 as at the interconnections of the arcuate panels 134. Optionally, the wall 100 may also be supported along its perimeter by supports 136 in a manner known in the art, especially at planar panels 132. Use of planar panels 132 in the wall 100 expands useful embodiments from a circular structure as a swimming pool (or circular skating rink) to a "race track" structure or "hockey rink" structure, both suitable for use as a skating rink, especially an ice skating rink in which water is first added before being frozen by weather conditions. A sheet of ice within a structure as seen in FIG. 10 also benefits from the height of the wall 100 if the game of ice hockey is being played within the enclosed skating rink area. One or more of the planar panels 132 can be configured to have panel interconnections to form a door for entry onto the sheet of ice.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A swimming pool comprising:
a pool wall forming an enclosed perimeter of the swimming pool, the pool wall including a plurality of layers of reinforced composite material each layer including thermoplastic resin and a plurality of elongate glass strands of reinforcing material, a first set of the plurality of layers having each of the strands therein unidirectionally oriented and running in a first direction throughout the layer, and a second set of the plurality of layers having each of the strands therein unidirectionally oriented and running in a second direction throughout the layer, wherein the first direction is offset from the second direction, and the first and second set of layers are fused together to form a unitary composite wall.

2. The swimming pool as defined in claim 1, wherein the wall has an inner surface and an outer surface, the outer surface being covered with a UV attenuating film.

3. The swimming pool as defined in claim 1, wherein the wall is formed of thermoplastic resin and glass strands.

4. The swimming pool as defined in claim 1, further including a base rail and a top rail, the pool wall extending between the bottom rail and the top rail, a plurality of supports extending between the top rail and the base rail and spaced along a circumference of the base rail for supporting the pool wall.

5. The swimming pool as defined in claim 1, wherein a pool liner formed of a waterproof material is disposed within the enclosed perimeter and secured to the top rail.

6. The swimming pool as defined in claim 1, wherein the pool wall is a single continuous sheet of material having opposing ends secured together at a joint to form the enclosed perimeter.

7. The swimming pool as defined in claim 6, wherein the opposing ends overlap each other and each opposing end includes a reinforcement strip bonded thereto forming an area of increased thickness, a plurality of securement holes being formed in the areas of increased thickness to receive fasteners for securing the opposing ends together.

8. The swimming pool as defined in claim 1, wherein two of the plurality of layers are adjacent to each other forming inner layers and the strands of the inner layers being oriented in the same direction.

9. The swimming pool as defined in claim 8, wherein two of the plurality of layers form outer layers and the two inner layers are disposed between the outer layers, the strands of the outer layers being oriented in a direction offset in angle form the strands of the inner layers, expressed in orientation as a Not 0°/0°/0°/ Not 0° combination.

10. The swimming pool as defined in claim 9, wherein the strands of the inner layers run in a direction along the circumference of the pool wall in a 0° orientation.

11. The swimming pool as defined in claim 10, wherein the strands of the outer layers run in a direction 90 degrees offset from the strands of the inner layers, expressed in orientation as a 90°/0°/0°/90° combination.

12. A method of forming a swimming pool wall comprising:
joining, to form a cylindrical structure, opposing ends of a laminage comprising a plurality of layers of reinforced composite material, each layer including thermoplastic resin and a plurality of elongate glass strands of reinforcing material, a first set of the plurality of layers having the strands running in a first direction, and a second set of the plurality of layers having strands running in a second direction, wherein the first direction is offset in angle from the second direction, and the first and second set of layers are fused together to form a unitary composite wall;
inserting a pool liner in the interior of the cylindrical structure; and wherein the first set of wall layers is disposed between layers from the second set of wall layers and the strands of the first set of layers extend along a longitudinal extend of the first layers, and the strands of the second set of layers include strands running transverse to a longitudinal extend of the second layers, and wherein the first set of layers are disposed between a pair of second set of layers.

* * * * *